BEST AVAILABLE COPY
BEST AVAILABLE COPY
M. Marshall.
Straight Knitting Mach.
No. 1,801.
Reissued Oct. 25, 1864.
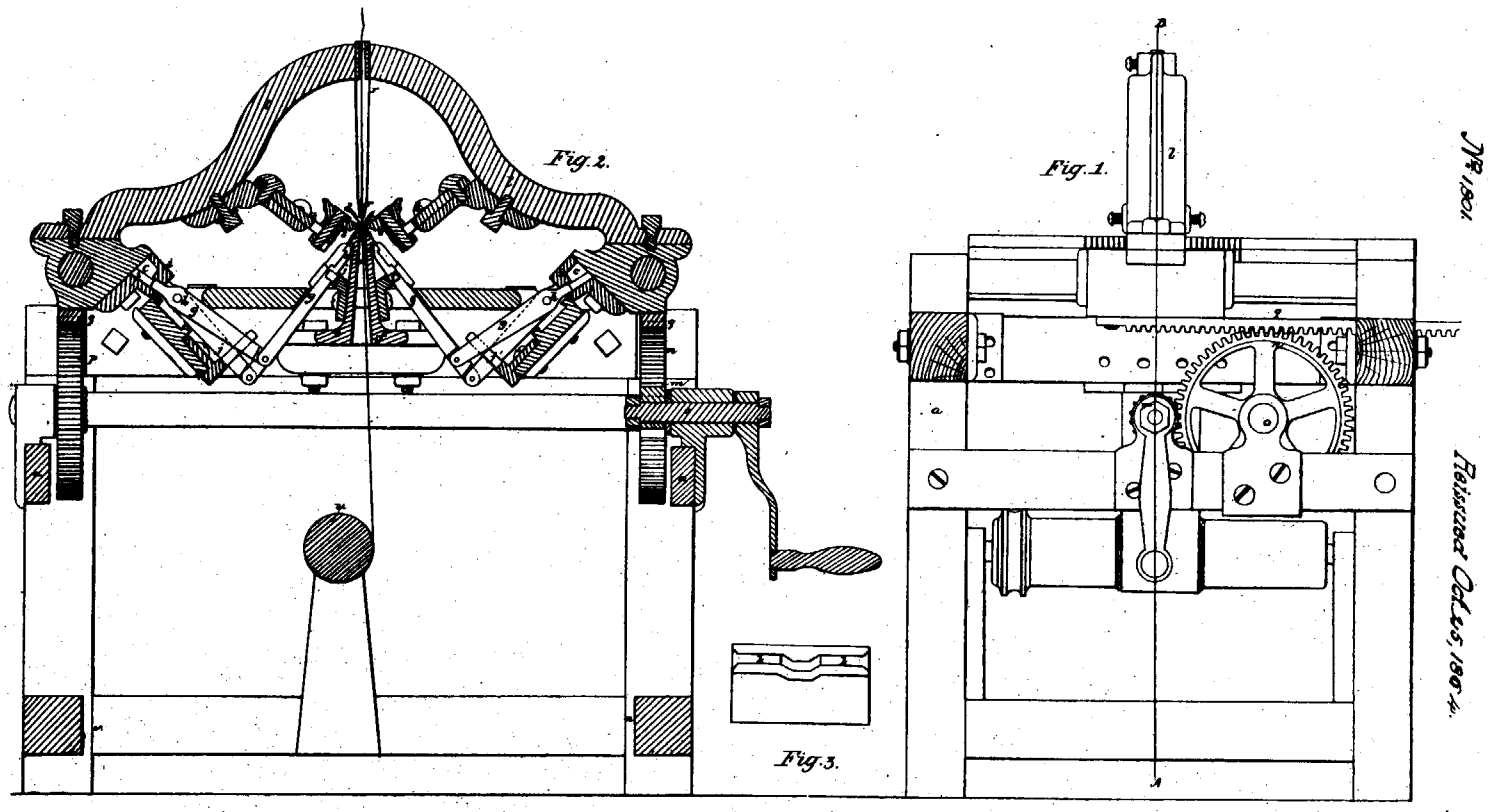

UNITED STATES PATENT OFFICE.

MOSES MARSHALL, OF LOWELL, MASSACHUSETTS, ASSIGNOR TO HIMSELF, W. ALDRICH, AND L. B. TYNG.

IMPROVEMENT IN KNITTING-MACHINES.

Specification forming part of Letters Patent No. 9,621, dated March 15, 1853; Reissue No. 1,801, dated October 25, 1864.

*To all whom it may concern:*

Be it known that I, MOSES MARSHALL, of Lowell, in the county of Middlesex and State of Massachusetts, have invented certain new and useful Improvements in Knitting Looms (having assigned all my interest therein to myself, W. ALDRICH, and L. B. TYNG, of said Lowell;) and I do hereby declare that the following is a full, clear, and exact description of the construction and operation thereof, reference being had to the accompanying drawings, forming a part of this specification, in which—

Figure 1 is an end view; Fig. 2, a central section taken in the plane of the line A B of Fig. 1, and Fig. 3 is a detail view hereinafter referred to.

Like parts are indicated by the same letters in all the figures.

In making the plain and ribbed or fancy fabrics which have hitherto been manufactured either on hand or power looms it has been necessary to use separate machines for different kinds of work.

The peculiar feature of my improvements consists in introducing into a loom for knitting plain work a peculiar arrangement of devices by which either plain or any kind of ribbed work can be made in the same loom; and the apparatus for accomplishing this object consists of an additional set of needles working on the opposite side of the needle-rest at an angle with the first set, the needles on one side (in plain work) having no beards, and taking the place of jacks in ordinary looms, so as to hold the yarn for the bearded needles on the other side to take. The needles on each side, instead of drawing the yarn, as in ordinary looms, all at once, operate one after the other—a movement which is so performed as to give just the requisite quantity of yarn to the bearded needle.

Fancy ribbed work is made in my improved loom by removing part of the bearded needles on one side in some particular order, according to the number of ribs which are to be made, and substituting needles without beards in their stead.

To enable others skilled in the art to make and use my improvements, I will now proceed to describe their construction and operation.

*a a a a.* in the drawings represent the framework of the machine.

*c c*, &c., and *d d*, &c., are the two sets of needles placed at an angle to each other, one set on each side of the stationary needle-rests *e e* and *f f*. These needles are inserted in the sockets of the hinged arms or levers *g g*, &c., which turn on a fulcrum at *h*, and move in the guides *j j* and *j′ j′*. The needles (above or beyond the levers *g g*) are still further guided and prevented from bending or moving laterally by being embedded and sliding longitudinally, each in a separate groove, (see Fig. 1,) in the rests *e f*. Motion is imparted to each set of needles (by which they are raised and lowered one at a time, instead of dropping by their own weight or by springs) through the arms *g g*, the ends of which are acted upon by the traversing boxes *i i*, in each of which is a cam-shaped groove, *k k*, as shown in detail in Fig. 3. These boxes are attached to the curved arm *l l*, which extends across the machine, and has a traversing or reciprocating motion imparted to it by means of the pinion *m*, which works in the teeth of the gear-wheel *n*, on the shaft *o* of which is the gear-wheel *p*, the teeth of which, as also the teeth of the wheel *n*, work the racks *q q*, placed one under each of the boxes *i i*, by means of which arrangement and combination the two opposite sets of needles are moved alternately and at the proper time in relation to each other.

In the center of the arm *l l*, and moving with it, is placed the feeder *r r*, through which the yarn is carried from the bobbin to the needles. To the arm *l l* are also attached the rotary depressers *s s*, for pressing the beards of the needles, as will be hereinafter explained, and so placed in their sockets or rests *t t* as to be adjustable.

In knitting plain work the bearded needles on one side are removed and needles without beards inserted in their place, these latter needles taking the place of jacks in ordinary looms, and serving to hold the yarn fed along by the feeder *r r* for each bearded needle on the other side to take, the yarn being drawn and held by each needle separately, the needles being raised up and down by the needle-arms *g g*, &c., and cam-boxes *i i*, as hereinbefore explained.

The fabric, as fast as it is made, is drawn down between the needle-rests *e e* and *f f*, which are a sufficient distance apart to admit the cloth and hold it while the loops are being drawn by means of the roll *u*, which has a rotary take-up motion imparted to it in any of the various ways commonly practiced.

In making ribbed fabrics both sets of needles are bearded, one needle taking the yarn and drawing it to one side of the needle-rest and the opposite needle taking the yarn and drawing it to the other side, the loops or stitches being drawn alternately on each side as the cam-boxes are passing from one side of the machine to the other. Each needle, on taking the yarn a second time, carries the said yarn down through the loop first made, which is loosened by its needle rising, and so on continuously, the beard of the needle being depressed at the right time so as to pass down through this loop and form the stitch by means of the rotary depressers *s s*, which traverse with the arm *l l*.

In making fancy ribbed fabrics—for instance, two ribs on one side and one on the other—every other needle of one set is removed and a needle without a beard inserted in its place. In three-ribbed work there are two plain needles to one bearded needle, and so on till all the bearded needles of one set are removed and plain ones inserted in their stead, which will produce plain work, as hereinabove described.

The motion of the pinion *m* must be changed into a reciprocating rotary motion, by which the cam-boxes will be made to traverse forward and back, and this can be effected in any of the ways commonly practiced for changing a continuous rotary motion into a reciprocating rectilinear motion.

Having thus described the construction and operation of my improvement in knitting-looms, what I claim as my invention, and desire to secure by Letters Patent, is—

1. Forming the stitches alternately on each side of the needle-rests by two sets of needles placed at an angle to each other, and operating one needle at a time, substantially as described.

2. The two plates or rests *e* and *f*, or their equivalents, so arranged as to support the two sets of needles and allow the fabric knit to pass between them, substantially as described.

3. Connecting the cam-boxes *i i*, which actuate the opposite sets of needles, by means of the arm *l l* or its equivalent, so as to give the proper alternate and relative movements to said sets of needles, substantially as described.

4. Connecting the feeder which carries the thread with the arm which connects the cam-boxes, substantially as and for the purpose described.

6. Two sets of single and independent needles crossing at an angle to each other, and those of each set moving in direct or parallel lines, and the two sets operating alternately on each side of said angle, substantially as and for the purpose described.

MOSES MARSHALL.

Witnesses:
DAVID LANE,
ITHAMAR A. BEARD.